(12) United States Patent
Hillen et al.

(10) Patent No.: US 8,282,453 B1
(45) Date of Patent: Oct. 9, 2012

(54) TAILINGS DISTRIBUTION CONTROL FOR HARVESTER

(75) Inventors: Curtis Frederick Hillen, Lititz, PA (US); Todd A. Cannegieter, Leola, PA (US)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 13/106,493

(22) Filed: May 12, 2011

(51) Int. Cl.
*A01F 12/52* (2006.01)

(52) U.S. Cl. .......................................... 460/13; 340/684

(58) Field of Classification Search .................. 340/684; 701/50, 1, 36; 460/13, 14, 9, 4, 5; 56/10.2 R
See application file for complete search history.

(56) References Cited

U.S. PATENT DOCUMENTS

| | | | | |
|---|---|---|---|---|
| 2,309,736 | A * | 1/1943 | Makin | 460/14 |
| 3,976,084 | A * | 8/1976 | Weber | 460/14 |
| 4,259,829 | A * | 4/1981 | Strubbe | 460/5 |
| 4,360,998 | A * | 11/1982 | Somes | 460/5 |
| 4,441,513 | A * | 4/1984 | Herwig | 460/1 |
| 4,470,420 | A | 9/1984 | Hanaway | |
| 4,884,993 | A | 12/1989 | Hemker et al. | |
| 5,421,777 | A | 6/1995 | Strubbe et al. | |
| 6,053,811 | A * | 4/2000 | Johnson et al. | 460/6 |
| 6,932,697 | B2 * | 8/2005 | Baumgarten et al. | 460/1 |
| 6,941,736 | B2 * | 9/2005 | Freeman | 56/10.2 C |
| 6,962,526 | B2 * | 11/2005 | Ho et al. | 460/1 |
| 6,974,384 | B2 | 12/2005 | Schmidt | |
| 6,991,537 | B2 | 1/2006 | Sahr et al. | |
| 7,025,673 | B2 | 4/2006 | Schmidt et al. | |
| 7,074,125 | B2 | 7/2006 | Ho et al. | |
| 7,297,051 | B1 | 11/2007 | Schmidt et al. | |
| 7,297,052 | B2 | 11/2007 | Maertens et al. | |
| 7,322,882 | B2 | 1/2008 | Duquesne et al. | |
| 7,362,233 | B2 * | 4/2008 | Behnke et al. | 340/684 |
| 7,403,846 | B2 | 7/2008 | Maertens et al. | |
| 7,427,232 | B2 | 9/2008 | Schmidt et al. | |
| 7,553,226 | B2 | 6/2009 | Dhont et al. | |
| 7,572,180 | B2 * | 8/2009 | Ricketts et al. | 460/101 |
| 7,630,808 | B2 * | 12/2009 | Behnke et al. | 701/50 |
| 7,632,183 | B2 | 12/2009 | Schmidt et al. | |
| 7,654,892 | B2 | 2/2010 | Pope et al. | |
| 7,670,218 | B2 * | 3/2010 | Behnke et al. | 460/4 |
| 7,771,260 | B2 * | 8/2010 | Ricketts et al. | 460/9 |
| 7,872,587 | B2 * | 1/2011 | Hindryckx et al. | 340/684 |
| 7,921,626 | B2 * | 4/2011 | Maertens et al. | 56/10.2 R |
| 2003/0066277 | A1 * | 4/2003 | Behnke | 56/10.2 R |
| 2003/0216158 | A1 * | 11/2003 | Bischoff | 460/6 |
| 2008/0228361 | A1 * | 9/2008 | Behnke et al. | 701/50 |
| 2010/0071333 | A1 | 3/2010 | Temple et al. | |

FOREIGN PATENT DOCUMENTS

| | | |
|---|---|---|
| JP | 402200115 A | 8/1990 |
| JP | 2003265025 A | 9/2003 |
| JP | 2006129793 A | 5/2006 |

* cited by examiner

*Primary Examiner* — Arpad Fabian-Kovacs
(74) *Attorney, Agent, or Firm* — Michael G. Harms

(57) ABSTRACT

A method and system for use with the combine to modify tailings conveyed to a cleaning system grain bed. Methods and systems are provided that utilize one or more sensors to detect uneven distribution of crop material in the grain bed, which provides information for a controller to determine whether adjustments to a tailings distribution system is needed to encourage even distribution of crop material in the grain bed. Elements in the tailings distribution system can be adjusted to alter direction of tailings conveyed to the grain bed to encourage even distribution of crop material on the grain bed. The system may also inform an operator of suggested manual adjustments to mitigate the non-uniformity.

18 Claims, 13 Drawing Sheets

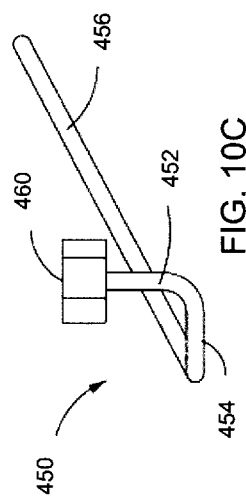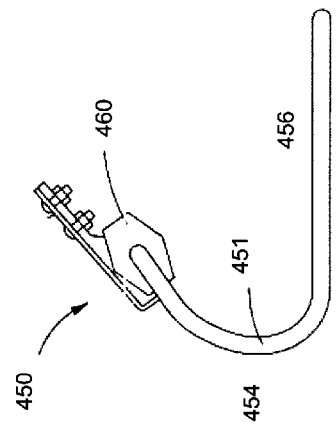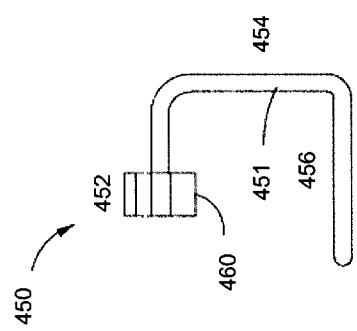

TAILINGS DISTRIBUTION CONTROL FOR HARVESTER

TECHNOLOGY FIELD

The present invention relates generally to agricultural harvesters, and more particularly, an adjustable tailings distribution system and method for improved redistribution of tailings materials back to the harvester cleaning system.

BACKGROUND

A combine harvester is a machine that is used to gather, thresh, and clean a wide range of grain crops while returning the straw, chaff and material other than grain (MOG) back to the earth in a single pass over the field. Typically, a combine harvester gathers the crop from the field with a header and transports the crop by means of a feeder house to a threshing and separating device located inside the combine. Generally, threshing refers to removing grain, beans, seeds or kernels, hereinafter referred to as just grain, which are desired to be collected, from husks, cobs, pods, stems, straw, and other portions of the plants being harvested, which are to be discarded.

The threshing and separating mechanism of the combine typically consists of a rotating threshing rotor or cylinder to which grooved steel bars, commonly referred to as rasp bars or threshing elements, may be bolted. These rasp bars thresh and aid in separating the grains from the chaff and straw (sometimes referred to as residue) through the rubbing action of the rotor or cylinder against the concaves, i.e., shaped "half drum," that may also be fitted with angled steel bars (e.g. rub bars) and a meshed grill, through which grain, chaff and smaller debris may fall, whereas the straw, being too big or long, is carried through to the outlet. Typically, the rotor or cylinder speed may be variably adjustable and the distance between the rotor or cylinder and concave may be finely adjustable laterally and together, to achieve optimum separation and output.

In an axial flow combine, where the rotor is axially mounted, this threshing and separating system serves a primary separation function. The harvested crop is threshed and separated via a mechanical rubbing action as it is conveyed between a longitudinally arranged rotor and the inner surface of an associated chamber comprising threshing and separating concaves. The cut harvest material spirals rearward and is conveyed along a helical path along the inner surface of the chamber until substantially only larger residue remains. When the residue reaches the end of the threshing rotor, it is expulsed out of the rear of the combine, often via a straw beater, straw chopper and/or straw spreader. Meanwhile, the grain, chaff, and other small debris falls through the concaves and grates onto a secondary separating and cleaning system. For ease of reference, this smaller particulate harvest material that contains the grain and chaff is referred to as threshed crop and the secondary separating and cleaning system is referred to simply as the cleaning system.

In the cleaning system the threshed crop is further processed to separate the grain from the chaff by way of a winnowing process. The objective of this winnowing process is for the clean grain to fall via gravity through a series of sieves where it will be collected and elevated to a temporary storage device while the chaff and (MOG) is transported to the rear of the machine and expelled back to the field. On most modern combines, the cleaning system is composed of a conveyor system, a plurality of reciprocating sieves, and a fan blower. The conveyor system, which may be a plurality of augers, a reciprocating grainpan, or another suitable conveying device, receives the threshed crop from the threshing system and delivers it to front part of the sieves where the winnowing process begins. Each sieve is a generally planar surface with a plurality of holes or openings appropriately sized such that the desirable grain can fall through while the larger undesirable chaff particles cannot. The fan blower produces an air blast which is generally directed upward and rearward through the sieves to assist with the winnowing process by levitating the chaff material, which is generally less dense than the grain, thereby improving the probability of sieving the grain. Most cleaning systems are composed of multiple layers of sieves, generally two, wherein the upper sieve, herein referred to as the grain bed has larger openings to capture all of the grain and inevitably some smaller, denser bits of chaff while the lower sieve has smaller openings such that more thorough sieving of the clean grain can occur. Any material that passes through the upper sieve and is transported to the rear of the lower sieve without passing though is referred to as tailings. In many harvesters, the grain bed may include one, some, or several sections of upper sieves. In some embodiments, the upper sieves may also include pre-sieves. For ease of reference, material traveling along the grain bed in the cleaning system will be described as simply crop material, since it may include threshed crop and returned tailings.

The chaffing and sieving system on most modern combines operates on the assumption that the conveyor system delivers fairly uniform grain across the width of the grain bed. For example, the chaffing process optimally works on an assumed range of thicknesses of separated crop material in a grain bed, which allows fans to blow off the chaff. If the thickness of the crop material in the grain bed is too thick, the airflow supplied will be insufficient. Furthermore, the sieves may be unable to process the grain quickly enough, such that if threshed crop and/or tailings are delivered too quickly to one portion of the sieve area in the grain bed, the system may clog or the yield of the grain delivered to other portions of the cleaning system may be reduced. If the crop material is too thick or moves too fast in the grain bed for all grain and/or MOG to penetrate the sieves, the grain and MOG, herein further named heavy crop matter, when described in the grain bed, will undesirably exit the rear of the grain bed and result in heavy crop matter loss.

In many cases, it is desired for material that could not penetrate the lower sieves, the tailings, to be threshed and/or cleaned again. In some harvesters, threshing and/or cleaning of the tailings is accomplished by conveying them to one side of the combine with an auger. The tailings are then carried by a conveyor, typically a paddle and chain conveyor, back to the combine threshing mechanism. Some combines have used a rethreshing device, which is separate from the threshing system and helps save capacity on the threshing system by rethreshing the tailings separately from new crop coming into the combine. The auger feeds material into the rethreshing device and then the material is conveyed back to the cleaning system. Both single impeller/blowers and augers have been used to convey this material back to the cleaning system. These rethreshing devices are usually convertible, enabling the operator to manipulate the machine to be more or less aggressive, depending on the vulnerability of the grain to damage, during processing.

In other harvesters, the tailing are conveyed by an auger to a tailings conveyor in proximity to the cleaning system. The tailings conveyor, in some harvesters, incorporates a series of impellers, or fans, to lift tailings up the side of the cleaning system and then distributes the grain back to the grain bed for re-cleaning.

The upper sieves of a cleaning system are normally composed of separate lengthwise sections separated by upstanding dividers which are operable to allow only for restricted lateral movement of crop material along the grain bed of the cleaning system. When distributing the tailings from a transverse side of the harvester under a sharp angle onto a top layer of the crop material on the upper sieves, the grain kernels contained in said tailings have a tendency to penetrate said layer and to continue their trajectory until movement thereof is restricted by a divider, delimiting, in that direction, the section in which the grain kernels have been projected. As a result of this action, returned tailings start to accumulate on one side of a section as additional heavy crop matter, whereas chaff material which is much lighter than the heavy crop matter, is dispelled to the other transverse side of the section whereby the even distribution of heavy crop matter and chaff transversely of a section becomes disturbed. It is clear that concentrating the grain on one side of a section and the chaff material at the other side thereof, results in overloading and/or underloading of the respective sections on the grain bed ultimately leading to heavy crop matter losses at the rear of the grain bed due to lateral non-uniform loading of crop material across the grain bed. The overloading or uneven loading in the grain bed, demonstrates uneven distribution of crop material in the grain bed, and dampens the effectiveness of the fan to blow chaff from crop material in the grain bed. Blown air from the fan moves through the grain bed in a path of least resistance so that uncovered portions of the grain bed receive most blown air and heavily covered portions receive little blown air. Thus, cleaning on the grain breaks down.

Conventional operation procedures recommend that an operator visually and manually inspect the grain bed to determine if crop material is uniformly distributed across the grain bed. Non-uniform distribution of crop material across the grain bed typically occurs in combines equipped with axially mounted rotors or when the combine is operated on slopes. Presently, the operator is required to perform a kill stall, whereby the operator stops the combine, gets out of the cab, accesses the grain bed or conveyor system, and checks for uniform or uneven distribution as well as for grain or MOG loss over the rear side of the cleaning system. If the grain bed is uneven, the operator can manually adjust mechanisms in the threshing and conveyor system until crop material entering the grain bed results in substantially uniform distribution of crop material in the grain bed. This process is labor intensive and requires a skilled operator.

What is needed is a means to sense crop material distribution in the grain bed so as to optimize a tailings distribution system to improve the total distribution of crop material on a grain bed or conveyor system in a cleaning system.

SUMMARY

Embodiments of the present invention address and overcome one or more of the above shortcomings and drawbacks, by providing methods and systems for sensing distribution of crop material in a grain bed, determining whether an adjustment is needed to improve the total distribution of crop material in the grain bed and adjusting a tailings distribution system to improve the total distribution of crop material in the cleaning system to thus optimize the cleaning system.

Embodiments of the present invention are directed to a combine comprising a cleaning system having a grain bed having a front end, a rear end, and two sides. The two sides are parallel to each other across a width of the grain bed and the length of the grain bed extends from the front end to the rear end of the grain bed. The combine further includes a cleaning conveying system for processing a crop material by moving the crop material between the front end and the rear end of the grain bed. The combine further includes a tailings distribution system that receives crop material previously processed in the cleaning system and redistributes the previously processed crop material back to the cleaning system. The combine further includes one or more sensors placed at the grain bed for monitoring crop material distribution in the grain bed. The combine further includes a control system for receiving a signal from the one or more sensors. The combine further includes a tailings distribution adjustment mechanism for adjusting the crop material redistribution in response to the sensed crop material distribution in the cleaning system.

Embodiments of the present invention are directed to a system for controlling crop material distribution in a cleaning system that includes a grain bed in a cleaning system for processing crop material by moving the crop material along the length of the grain bed extending from a front end of the grain bed to a rear end of the grain bed between two parallel sides. Each side is located across the width of the grain bed from the other side. The system further includes a tailing distribution system that receives crop material previously processed in the cleaning system and redistributes the previously processed crop material on to the grain bed. The system further includes one or more sensors placed approximately at the grain bed for sensing crop material distribution in the grain bed. The system further includes a control system for receiving signals from the one or more sensors. The control system monitors the signals to evaluate the crop material distribution in the grain bed. The system further includes one or more adjustable elements coupled to the control system. The adjustable elements can alter the redistribution of crop material from the tailing distribution system onto the grain bed.

According to one embodiment of the invention, the tailings distribution adjustment mechanisms comprise an impeller having an adjustable speed. According to another embodiment of the invention, the tailings distribution adjustment mechanism comprises an adjustable deflector. According to one aspect of one embodiment of the invention, the adjustable deflector is alterable about a pivot connection on the tailing distribution system to alter the angle of the crop material redistributed back to the cleaning system. According to one aspect of one embodiment of the invention, the altered angle is any angle to redistribute crop material to any location across the width of the grain bed. According to one aspect of one embodiment of the invention, the altered angle is any angle to redistribute crop material to any location across the length of the grain bed between the front end and the rear end of the grain bed. According to another embodiment of the invention, the tailing distribution system mechanism comprises both an impeller having an adjustable speed and an adjustable deflector.

According to one embodiment of the invention, the combine further comprises an operator interface for displaying information about crop material distribution in the grain bed.

According to one embodiment of the invention, the one or more sensors includes one or more feeler rod sensors for detecting a local volume of crop material. According to one aspect of one embodiment of the invention, the one or more feeler rod sensors are mounted in proximity to the rear end of the grain bed. According to another embodiment of the invention, the one or more sensors includes one or more optical sensors for detecting a local volume of crop material. According to one aspect of one embodiment of the invention, the one or more optical sensors are located in proximity to the sides of the grain bed. According to another embodiment of the invention, the one or more sensors includes one or more load sensors for detecting a local mass of crop material. According to one aspect of one embodiment of the invention, the one or more load sensors are located in proximity to the rear end of the grain bed. According to another embodiment of the invention, the one or more sensors include one or more level switches for detecting an accumulation of crop material in relation to a level threshold. According to one aspect of one embodiment of the invention, the one or more level switches are located in proximity to the sides of the grain bed. According to another embodiment of the invention, the one or more sensors includes one or more quantized load sensors for detecting a number of crop material particles flowing in a local area. According to one aspect of one embodiment of the invention, the quantized load sensors lie in proximity to the rear end of the grain bed.

According to one embodiment of the invention, the control system adjusts a subset of the adjustable elements in substantially real time. According to another embodiment of the invention, the control system drives an electric actuator to alter the adjustable deflector about the pivot connection. According to another embodiment of the invention, the control system drives a rotary motor to alter the speed of the impeller. According to another embodiment of the invention, the control system adjusts the tailings distribution adjustment mechanism. According to another embodiment of the invention, the adjustable elements can be manually adjusted and the control system informs the operator of recommended adjustments to the manually adjustable elements. According to one aspect of one embodiment of the invention, the recommended adjustments are to correct crop material distribution in the grain bed based on the information. According to one aspect of one embodiment of the invention, at least a portion of the recommended adjustments require manual input from the operator.

Embodiments of the present invention are directed to a method for controlling distribution of crop material in a cleaning system within a combine. The method comprises the step of conveying crop material along a length of a grain bed extending from a front end of a grain bed to a rear end of a grain bed between two parallel sides in a cleaning system. Each side is located across the width of the grain bed from the other. The method also includes the step of cleaning conveyed crop material along the grain bed. The method also includes the step of collecting unclean crop material from the grain bed and conveying to a tailings distributor for recleaning. The method also includes the step of redistributing unclean crop material previously collected from the grain bed back to the grain bed from the tailings distributor. The method also includes the step of sensing at one or more sensors a distribution of crop material in the grain bed. The method also includes the step of receiving at a controller signals from the one or more sensors. The method also includes determining at the controller whether the distribution of crop material in the grain bed needs modification. The method also includes the step of adjusting one or more configurations of the tailings distributor to substantially alter redistributed unclean crop material to modify the distribution of the crop material in the grain bed.

According to one embodiment of the invention, the step of adjusting comprises adjusting one or more mechanically adjustable elements automatically. According to one embodiment of the invention, the method further comprises displaying, via an operator interface, recommended adjustments to correct the distribution of crop material in the cleaning system before the adjusting of the one or more mechanically adjustable elements occurs automatically.

Additional features and advantages of the invention will be made apparent from the following detailed description of illustrative embodiments referencing the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIGS. 10A, 10B, and 10C are a front facing, right facing, and top views, respectively of an exemplary feeler rod sensor for use with embodiments of the present invention;

DETAILED DESCRIPTION OF ILLUSTRATIVE EMBODIMENTS

The problems in the prior art have motivated the creation of methods and systems to modify tailings conveyance to a cleaning system grain bed to improve total distribution of crop material in the grain bed. This will thus improve operation of the cleaning system, including the chaffing and sieving processes. Sensing the distribution of crop material in the grain bed provides information whether adjustment to a tailings distribution system, to alter the conveyance of tailings to the grain bed, is needed for improving total crop material distribution in the grain bed.

In some embodiments, the system can sense and determine the approximate lateral load uniformity of crop material from heavy crop matter exiting the grain bed. Using electrically controlled drivers, or other electro-mechanical elements, some embodiments of the present invention can automatically adjust the configuration of the combine, including elements of the tailings distribution system, to substantially reduce or prevent heavy crop matter loss and thus lateral load non-uniformity of crop material traveling along the grain bed in the cleaning system. In some embodiments, deflectors are adjusted on the tailings distribution system to alter the conveyance path of tailings redistributed to the grain bed. In other embodiments, one or more impellers in the tailings distribution system are altered to rotate faster or slower to thus convey tailings further from or closer to the distribution system when redistributed to the grain bed. In other embodiments, both deflectors and impellers of the trailing distribution system are adjusted to alter the conveyance path of tailings redistributed to the grain bed. Furthermore, if manual adjustment of the combine configuration is needed to correct non-uniformity of crop material in the grain bed, some embodiments can automatically alert the operator of the needed adjustments. In some embodiments the operator can be informed of detailed steps to correct the non-uniformity. Some embodiments utilize sensors to monitor one or more of: a quantity of volume, a mass, a level of height of material piling, accumulation of crop material, and/or a flow rate of crop material in the grain bed, and/or heavy crop matter exiting the grain bed.

Figure 1:
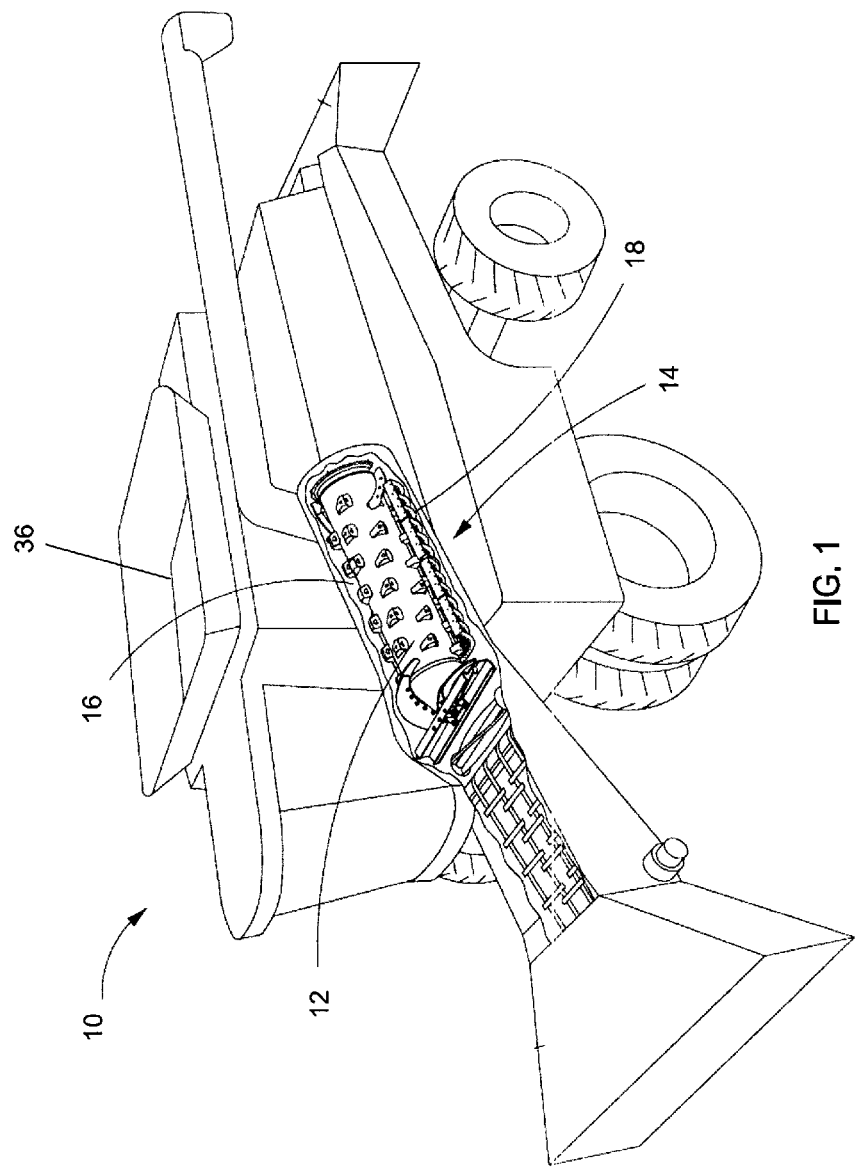
FIG. 1 is a perspective view of an exemplary harvester.

FIG. 1 shows an exemplary agricultural combine 10. The combine 10 includes a longitudinally axially arranged threshing and separation system 14 of well known construction and operation. The helical bar concave 18 may also be used with combines having transversely aligned threshing and separation system in a combine.

As shown, threshing and separation system 14 is axially arranged, in that it includes a cylindrical threshing rotor 12 conventionally supported and rotatable in a predetermined direction about a rotational axis there through for conveying a flow of crop material in a helical flow path through a threshing chamber 16 extending circumferentially around the rotor 12. As shown, concaves 18 may extend circumferentially around the rotor 12 and the flow of crop may pass in the space between the spinning rotor and the concaves. As the crop material flows through the threshing and separation system 14, the crop material including, for example, grain, straw, legumes, and the like, will be loosened and separated from crop residue or waste such as, for example, husks, cobs, pods, and the like, and the separated materials may be carried away from the threshing and separation system 14 in a well known conventional manner. As threshed crop falls through the grates in concaves 18 and other grates, it is moved by a conveyor system (not shown) to a grain bed in a cleaning system (not shown).

Figure 2:
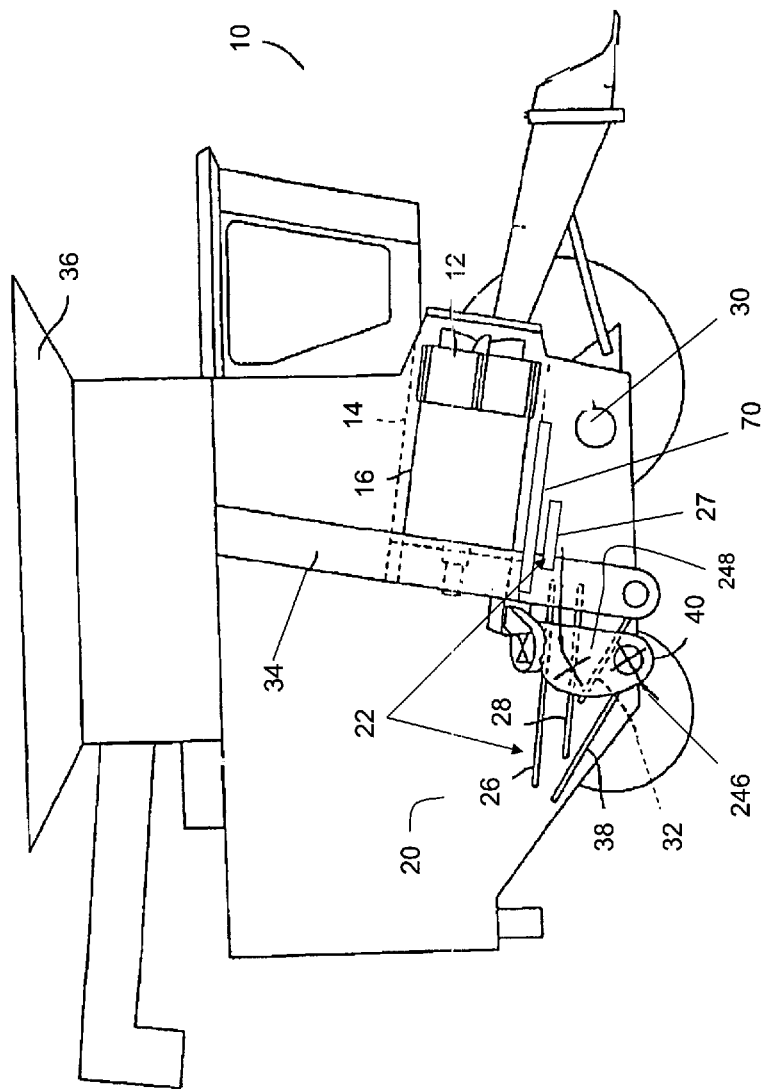
FIG. 2 is a simplified side view illustrating an exemplary cleaning and tailing distribution system within the harvester.

Referring to FIG. 2, an exemplary agricultural combine 10, showing a side view open look at the conveyor system 70 and cleaning system 20, is shown. The cleaning system 20 includes a grain bed 22. In many cleaning systems the grain bed 22 consists of an upper sieve 26, often referred to as a chaffer sieve. In other embodiments, the grain bed includes both an upper sieve 26 and a pre-sieve 27. Located below the upper sieve 26 in the cleaning system 20 is a lower sieve 28, often referred to as a shoe sieve. In many cleaning systems approximately eighty percent of cleaning occurs at the grain bed 22. The upper sieve 26, lower sieve 28, and pre-sieve 27 are members that oscillate back and forth. The sieves are typically suspended on linkage bars and shook upward and rearward. Sieves 26, 27, and 28 have a plurality of apertures for allowing properly threshed grain to fall through. A fan blower 30 blows air through sieves 26, 27, and 28 and out the rear of agricultural harvesting combine 10. Chaff will be blown outward along with the air. In many embodiments, the pre-sieve is slightly elevated from the upper sieve so the additional air is blown through gap between the upper sieve 26 and pre-sieve 27. The clean grain falls through sieves 26 and 28 onto an inclined plane 32. Clean grain travels along plane 32 and then through a grain elevator 34, to a grain storage area 36. The elevator 34 includes a paddle chain lift (not shown). The paddle chain lift, wherein the paddles are uniformly spaced along the chain to lift grain, conveys the grain upward to a dispenser auger (not shown) that discharges the grain into the grain storage area 36.

Grain and MOG, too heavy to become air borne, which falls with gravity through upper sieve 26 but does not pass through lower sieve 28, is commonly known as tailings. Tailings are removed by an auger to a rethreshing unit (not shown) or, in the present exemplary combine, end up on a plane 38 to be moved to a tailings distribution system 40 to be distributed back onto the grain bed 22.

Figure 3:
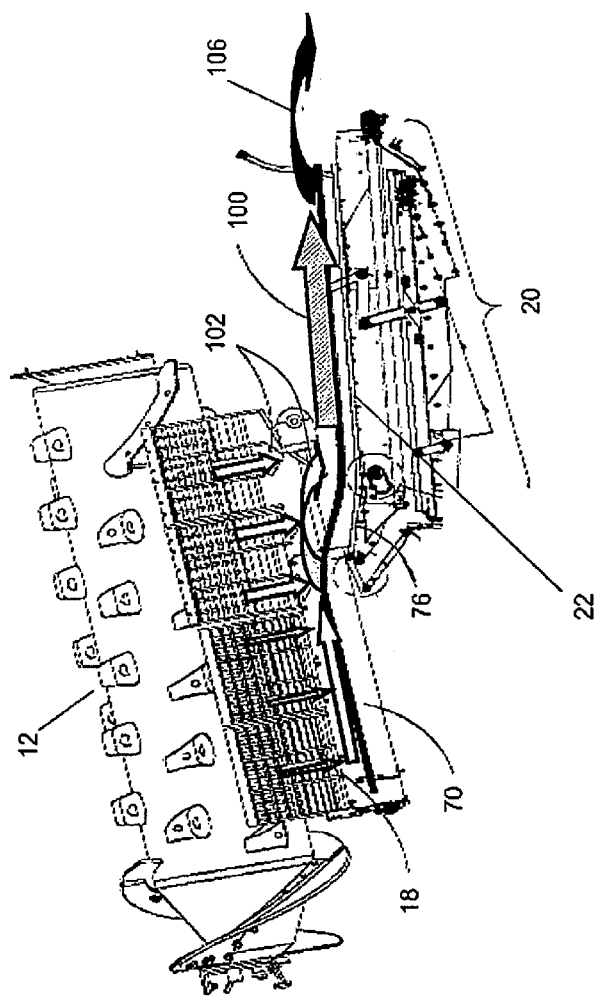
FIG. 3 is a side view fragmentary perspective of an exemplary conveyor in association with a feed auger of the harvester for feeding threshed material to the conveyor which then flows to an exemplary grain bed of a cleaning system.

FIG. 3 shows a more detailed figure of grain movement from thresher rotor 12 to the conveyor system 70 and then to the grain bed 22 of the cleaning system 20. As shown in FIG. 3, grain falling through the grates in the concave area 18, lands on a conveyor system 70 or a grain pan 76. Grain landing on the conveyor system 70 is conveyed to the back of the combine via a conveying action. In this manner, the conveyor system 70 acts as a collection system for the threshed crop.

Because the threshed crop falls through the grates in the concave, which in some embodiments generally will span the entire width of the rotating thresher rotor, threshed crop may fall anywhere within the conveyor system 70. Threshed crop may accumulate unevenly within the horizontal span of the conveyor system 70. The result of more threshed crop falling into the conveyor system on the left or the right side can be that material coming off of the conveyor system onto the cleaning system 20 is similarly uneven.

Figure 4:
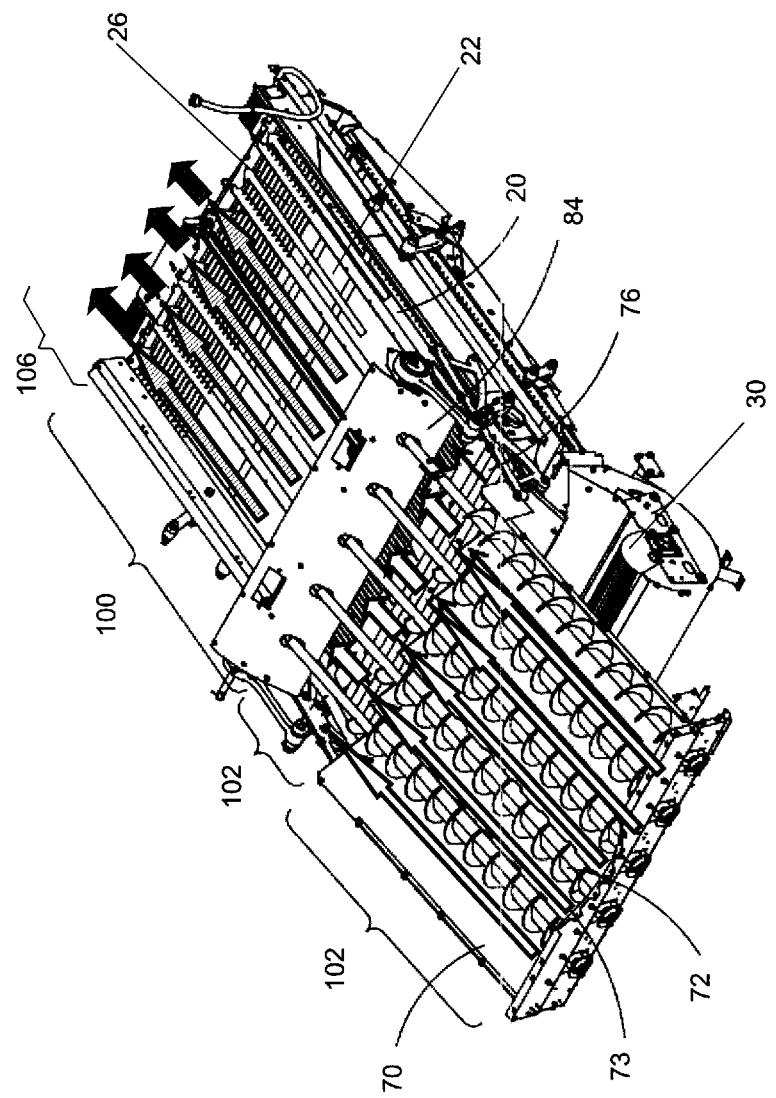
FIG. 4 is a perspective view of an exemplary conveyer and cleaning system showing flow of material.
Figure 5:
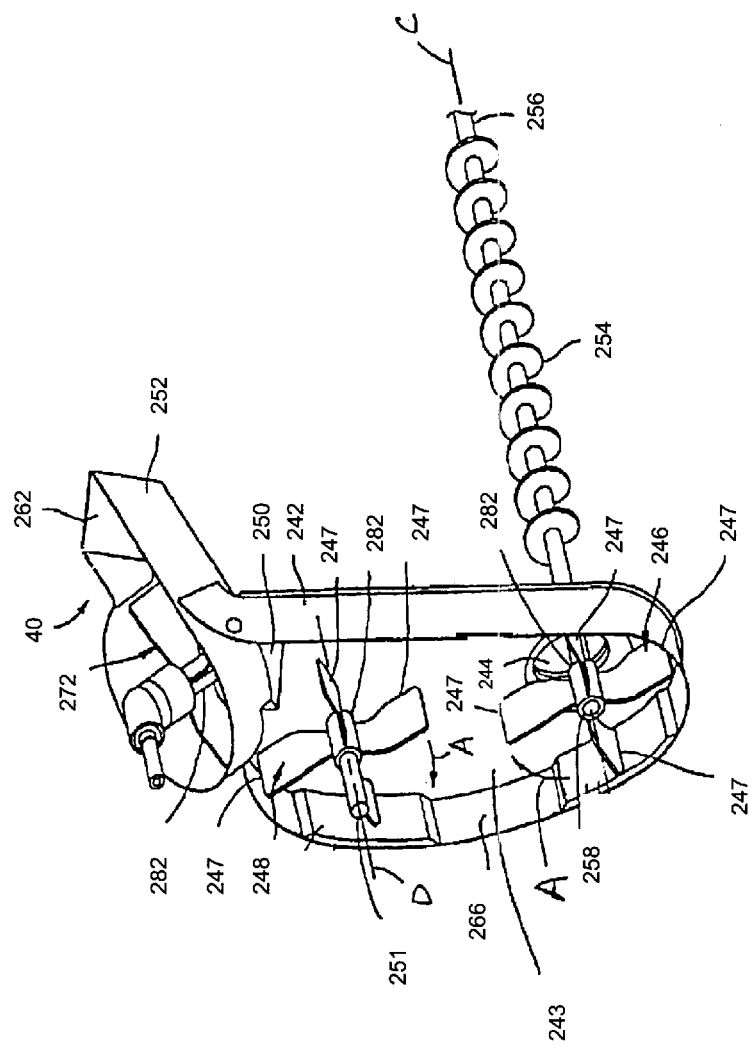
FIG. 5 is a simplified view of an exemplary tailings distribution system with a front cover removed to show internal aspects thereof including several rotary impellers.

In some embodiments, conveyor system 70 comprises a series of parallel augers 72 each in a separate trough 73 (see FIG. 4). Threshed crop falling into the conveyer system will often be unevenly distributed such that each auger trough 73 collects a different amount of threshed crop. In an exemplary embodiment shown in FIG. 4, five parallel augers 72 oriented from the front to back of the combine rotate in parallel troughs to move grain from the front to the back of combine and onto grain pan 76. In some embodiments, any number of parallel augers 72 in the conveyor system 70 can turn in the same direction. In some embodiments at least the augers at either end of the auger bed turn in opposite directions to help move grain from the walls towards the center of the auger bed 70.

In other embodiments, other conveyors known in the art can be used including a conveyor belt, a sloping surface, a fabric slide, or a reciprocating surface like a grain pan 76.

Threshed crop reaching grain pan 76 is moved to the rear of the combine via a reciprocating action and gravity. In some embodiments, grain pan 76 is a corrugated or stepped sheet. In some embodiments, grain pan 76 maybe used in conjunction with an overhead return pan 84 that slopes toward the front of the combine to prevent falling threshed crop from directly impacting the grain bed 22 in cleaning system 20. The threshed crop moving off of the conveyor system moves onto the grain bed 22 through a space between the overhead return pan 84 and grain pan 76. These two pans serve a limited smoothing function as grain enters the grain bed to be cleaned. However the smoothing effect of the reciprocating action of return pan 76 is often insufficient to counteract unevenness created by the distribution of falling threshed crop. This uneven dispersal can reduce the overall capacity of the cleaning system by overloading lateral portions across the width of the grain bed 22.

The threshed crop follow paths 102 as shown in both FIG. 3 and FIG. 4. After passing grain pan 76, threshed crop is moved on to a grain bed 22 in exemplary cleaning system 20. There, as described above, the upper sieve 26, and in other cleaning bed embodiments the pre-sieve 27 also, reciprocate to move crop material backwards along the length of the grain bed 22 in direction 100 to separate out the grain. Meanwhile the fan blower 30 blows air through the grain bed as the crop material moves across the sieves to remove chaff and other lightweight particulates. Both the chaffing and sieving processes are more efficient when the grain bed depth is limited and laterally uniformity, or even distribution, of crop material across the width of the grain bed is present. If the distribution of threshed crop coming onto grain bed 22 is uneven, there can be portions or piles of crop material, including heavy crop matter, too thick for the cleaning system to operate properly. Overloaded crop material on portions of the grain bed 22 means heavier crop matter will fail to drop through the sieves in the grain bed 22 to lower sieves. The heavy crop matter instead exits the rear of the grain bed in direction 106 resulting in heavy matter loss. The heavy matter loss means the cleaning system is inefficiently cleaning crop material.

In the prior art, if this situation occurs the operator will have to make a series of manual adjustments to prevent the grain from building up on one side or portion of the grain bed 22. In the present invention sensors sense the distribution of crop material in the grain bed 22. Sensing the distribution of crop material in the grain bed 22 provides information whether an adjustment to the tailings distribution system 40, to alter the conveyance of tailings to the grain bed, is needed for improving total crop material distribution in the grain bed 22.

In some embodiments, described further below, the sensors will help the operator of the combine to determine whether crop material distribution in the grain bed needs corrected. In some embodiments, described further below, the sensors will help the operator of the combine to determine if heavy crop matter is exiting the rear of the grain bed 22. In some embodiments, automatic adjustments to the tailings distribution system 40, described below, can improve distribution of crop material and lateral load uniformity of crop material in the grain bed 22. Exemplary placement of these sensors, in varying embodiments, are described further in FIG. 9.

FIGS. 5-8 show with more detail the internal components of an exemplary tailings distribution system 40. As shown in FIGS. 5-8, tailings distribution system 40 includes a housing 242 including an interior portion 243; a first opening 244 communicating with interior portion 243; a first rotary impeller 246 and a second rotary impeller 248 located in interior portion 243; and a second opening 250 communicating with interior 243 and a conduit 252. A third impeller 272 is located in conduit 252. The first and second impellers 246 and 248 are each rotated in predetermined rotational directions A on shafts 258 and 251, respectively, about substantially parallel rotational axes C and D extending longitudinally through the centers of shafts 258 and 251, respectively. The third impeller 272 may rotate in the opposite direction or as alternative in the same direction as the bottom two impellers 246 and 248.

Housing 242 receives the tailings, not passing through lower sieve 28, through first opening 244 by means of a conventionally constructed and operable cross conveying auger 254. In some embodiments, the cross conveying auger 254 may be replaced by a conveyor belt, rolling incline, or any other means to bring tailings from plane 38 into the housing 242. The cross conveying auger 254 rotates about rotational axis C on a shaft 256 coaxial with shaft 258 for moving the tailings toward the tailings distribution system 40, such that the tailings will be discharged by auger 254 through first opening 244 into interior portion 243 of housing 242 in a position to be propelled by rotating first impeller 246 through interior portion 243 to second impeller 248. As an alternative, first opening 244 can be offset from the shaft 258, such as depicted at 244a in FIG. 7, so that, for instance, tailings 260 are delivered into housing 242 at a lower location or more in the vicinity of the radial outer portion of first impeller 246.

Figure 7:
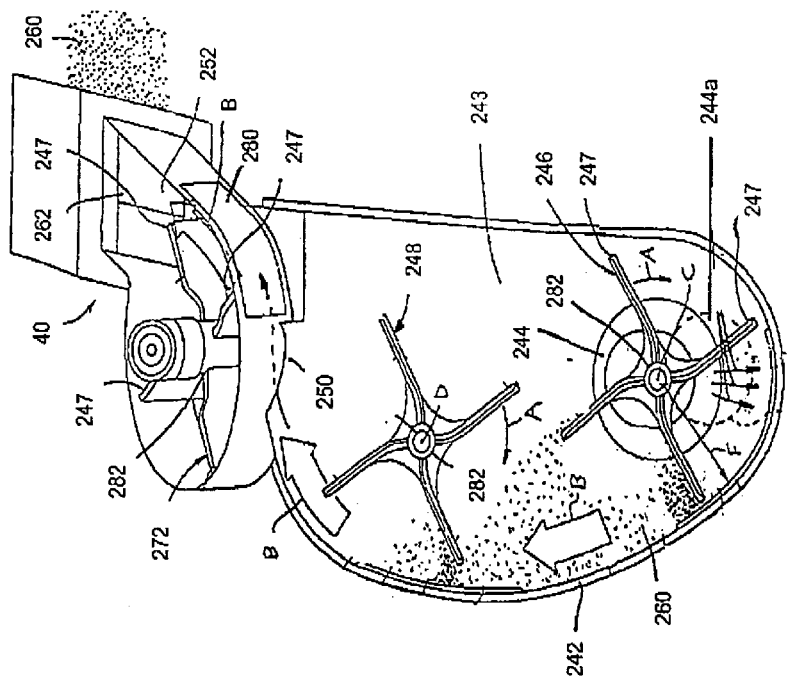
FIG. 7 is a frontal view of the tailings conveyor housing of FIG. 6 with the front cover removed and illustrating tailings being conveyed through the distribution system by the impellers.

First impeller 246, second impeller 248, and third impeller 272 each include a plurality of blades 247 extending generally radially outward relative to the rotational axis of the respective impeller. Each of the blades 247 is preferably curved or arcuate so as to have a concave surface 247a facing oppositely of the rotational direction A, and a convex surface facing forwardly in or toward the rotational direction A, such that each blade 247 is swept back relative to the rotational direction A, as best shown in FIG. 7.

The impellers 246, 248, and the second opening 250 are preferably radially in-line or aligned, such that tailings 260 which enter housing 242 at opening 244, or 244a, are propelled in rotational direction A by first impeller 246, and into the path of rotation of radially adjacent second impeller 248, as denoted by large arrow B. Second impeller 248 will then propel tailings 260 in direction, and through second opening 250 into conduit 252 into the path of rotation of third impeller 272, as also denoted by a large arrow B. Third impeller 272 will then propel tailings 260 through conduit 252, again as denoted by a large arrow B, so as to exit through a discharge outlet 262, so as to be spread over a predetermined region of the grain bed 22, or any other location desired. Threshing plates, such as threshing plate 280 in conduit 252 may be arranged with in the interior walls to guide or orient tailings throughout the tailings distribution system 40.

Preferred rotation of impeller 272 is counterclockwise, however clockwise will also suffice. The curved or arcuate or swept back shape of blades 247 of impellers 246, 248 and 272 has been found to cause a more aggressive threshing of tailings 260 and forces the tailings 260 to the radially outer portion of the blades 247 faster, which has been found to increase conveying capacity.

Figure 6:
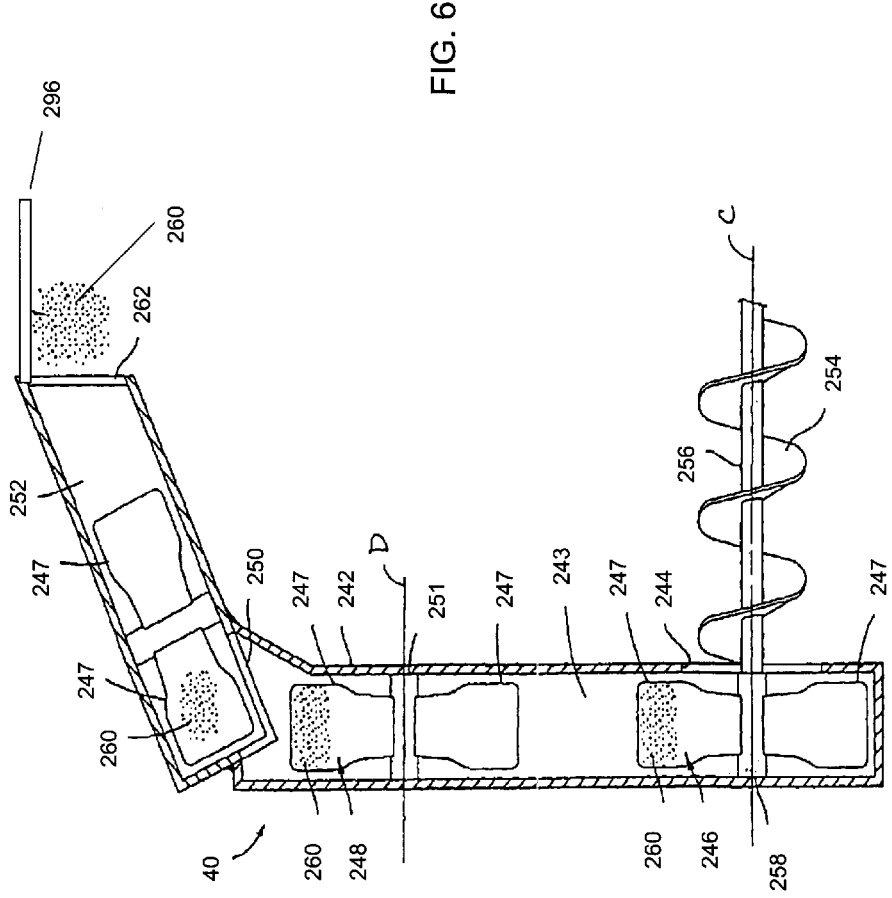
FIG. 6 is a simplified perspective view of the tailings conveyor in FIG. 5.

Impellers 246, 248 and 272 each includes a mounting portion 282 which is preferably a hub, mountable to a rotatable member, such as shaft 258 of the tailings distribution system 40 in the instance of impeller 246, for rotation with the rotatable member in a predetermined rotational direction, such as direction A, about a rotational axis, such as axis C, as best shown in FIG. 6. Impellers may be connected to an idler pulley (See FIG. 9) to provide maximum tension when a single motor drives impeller 246 and 248 connected by a belt around shafts 251 and 258. Each impeller 246, 248 and 272 includes a plurality of blades 247, preferably four in number, which extend generally radially outwardly from mounting portion 282 at equally spaced locations around the rotational axis. As noted before, each blade 247 includes a surface facing in a direction opposite the rotational direction, and a surface facing in the rotational direction.

Here, it should be noted that although it is contemplated that second impeller 248 and third impeller 272 are constructed the same and operate essentially the same as first impeller 246, it should also be noted that impellers 248 and 272 can be constructed differently, as required for providing different operating characteristics, as desired or required.

Figure 8:
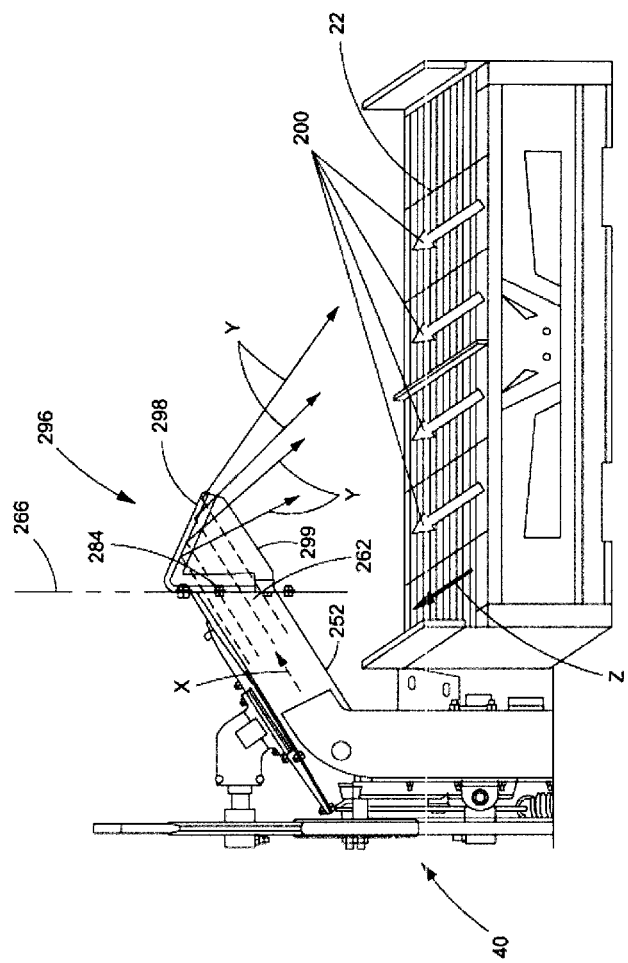
FIG. 8 is a detailed fragmentary perspective view of the tailings distribution system positioned to the side of the grain bed and showing the deflector and illustrating tailings being deflected and dispersed thereby onto the grain bed of the cleaning system in an embodiment of the present invention.

Referring also to FIGS. 6 and 8, the tailings distribution system 40 additionally includes a deflector 296 for discharge outlet 262, for deflecting and dispersing tailings 260 over a predetermined region of grain bed 22, or in some embodiments of the invention of conveyor system 70, of cleaning system 20. Deflector 296 preferably includes an upper deflector panel 298 capable of positioning as adjacent to an upper region of discharge outlet 262 so as to be located in a path of an upwardly directed flow of tailings 260 discharged there through, denoted by arrow X in FIG. 8, for deflecting the flow downwardly and dispersing the flow vertically, as denoted by arrows Y, and thus distributing tailings across the width of the grain bed 22. In addition, deflector 296 may include side deflector panels 299 positionable adjacent a side region of outlet 262 so as to be located in the path of at least a portion of the upwardly directed flow of tailings for deflecting and dispersing the flow horizontally anywhere across the length of the grain bed 22 in direction Z on top of crop material flow 200. Deflector 296 can be mounted in position in any convenient desired manner, such as through using hinges 284 in connection with conduit 252 around outlet 262. From connection at the hinges, or any other pivoting connection, the deflector can be adjusted at various angles. In some embodiments of the invention, the deflector could be positioned with respect to connection at the conduit 252 by a driver such as a linear electric actuator or rotary motor. Drivers are further discussed in reference to FIG. 11. It may also be positioned manually by hand or any other means. Outlet 262 is generally coincident with and extends through a side sheet 266 enclosing a side of combine 10 containing cleaning system 20 so as to be perpendicular to the grain bed 22. It is important to not interfere significantly with the discharge or flow of material from the threshing system onto the grain bed 22 or the upward and rearward flow of blown straw and chaff when distributing and deflecting the tailings from the discharge outlet 262 of the tailings conveyor system 40 onto the grain bed 22. It is desirable to spread the tailings such that no portion of grain bed 22 is overloaded.

Here, it should be noted that deflector panels 298 and 299 can be positioned and oriented differently for different applications. Additionally, side deflector panel 299 can extend fully into the tailings flow, or only partially therein, as desired or required for the distribution sought.

Further information regarding an exemplary tailings distribution system 40, such as shown in FIGS. 5-8, that may be used with embodiments of the present invention can be found in U.S. Pat. No. 6,991,537, entitled 'Deflector for a Discharge Outlet of a Tailings Conveyor of an Agricultural Combine', which is assigned to the present assignee of the present application and which is incorporated herein by reference in its entirety.

Figure 9:
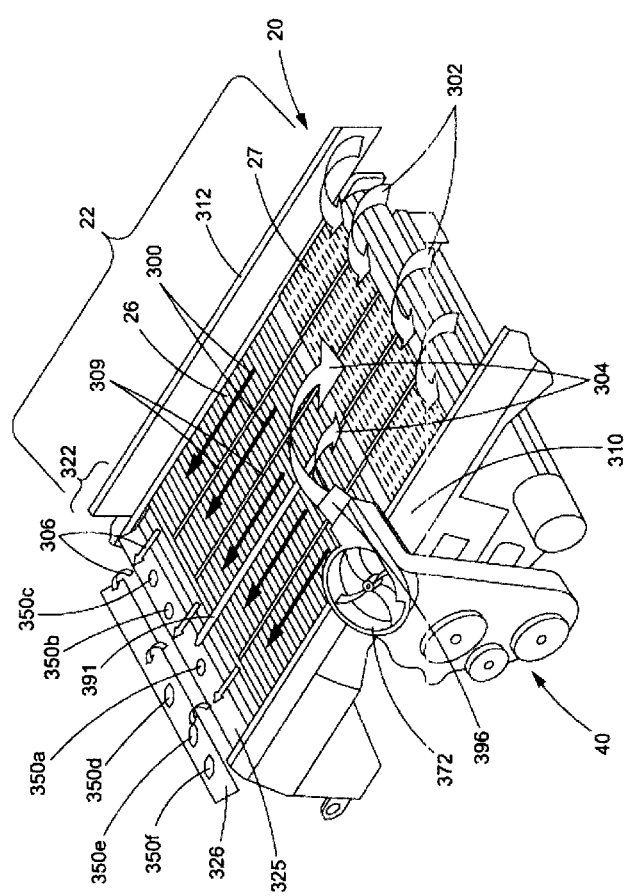
FIG. 9 is an elevated isometric view of an exemplary cleaning system for use with the present invention.

FIG. 9 presents a three-dimensional isometric view of the cleaning system 20 from above the grain bed 22 integrated with the tailings distribution system 40, present at the forefront in at least one embodiment of the present invention. In FIG. 9, crop material flow 300 is broken into a plurality arrows. In this embodiment, the pre-sieve 27 and upper sieve 26 are portioned across the width of the grain bed 22 by sieve dividers 309 running along the length of the grain bed parallel to distributor side 310 and far side 312. Sieve dividers provide means to adjust opening and closing spaces in the sieves. Crop material flow 300 includes separate material flow between dividers 309, each having potentially a different amount of crop material, and potentially combining threshed crop from thresh crop flow 302, entering the grain bed 22 from the conveyor system 70, with tailings in tailing flow 304 distributed from the tailing distribution system 40. The thresh crop flow 302 and tailings flow 304 mix to form the crop material flow 300.

Ideally, each of the individual crop material flows 300, between the sieve dividers 309, are substantially equal to each other, so that total distribution of crop material in the grain bed is uniform. However, without proper adjustment to conveyed tailings from the tailing distribution system 40 this may not be guaranteed. Without some means to redirect tailings flow 304, flows 300 will be uneven if tailings are distributed from the tailing distribution system 40 onto the same location on the grain bed 22 or if the tailings distributed on the grain bed begin piling on top threshed crop already accruing on the same sieves. As described throughout, it is desirable to create flows 300 that are substantially equal to one another, for even distribution of crop material in the grain bed, thus minimizing lateral loading non-uniformity, to optimize the efficiency of the cleaning system 20. In some embodiments of the invention it may be desirable to minimize lateral loading non-uniformity by distributing tailings in tailing flow 304 so as to be distributed on the conveyor system 70 (not shown in FIG. 9) in addition to or in alternative to the grain bed 22. The embodiments of the present invention are designed to detect unevenness in the flows shown in FIG. 9, resulting in uneven distribution, and provide feedback to adjust the deflector 396, alternatively adjust rotation speed of the impellers for example the third impeller 372 of this embodiment, or adjust any component of the tailings distribution system 40 to address uneven flows along the grain bed 22 of the cleaning system 20 and make them substantially uniform for even crop distribution. As an example, as in some embodiments, increasing the rotational speed of the third impeller would force tailings out of the discharge outlet to travel farther, landing farther from the tailing distribution system onto the grain bed. Slowing the rotational speed down would propel the tailings closer in the grain bed to the tailing distribution system. For example, if uneven distribution of crop material in the grain bed is occurring because the combine is angled on a hill and loading of crop material existed in the grain bed furthest from the tailing distribution system, then the rotational speed of an impeller can be slowed down so tailings enter the grain bed in an unloaded location.

To account for uneven distribution of crop material in the grain bed, including lateral load non-uniformity, sensors are located at the grain bed 22. In this and other embodiments, sensors are located at the grain bed rear 322 to sense heavy crop matter losses. Uneven loading across the grain bed 22 may be determined by the measure of heavy crop matter loss occurring at the grain bed rear 322. The heavy crop matter includes grain and MOG that should fall through the upper sieve 26 to the lower sieve 28, but due to uneven piles of crop material moving across the sieves and not falling through, the heavy crop matter moves in a heavy crop matter flow 306 across a cross member 325 located across the width at the grain bed rear 322. In this and other embodiments, heavy crop matter loss occurs when matter follows flow 306 over the edge of the cross member 325.

By placing sensors at various locations in or around the grain bed 22, or at the grain bed rear 322, the present invention can detect an uneven load distribution laterally across the width of the grain bed 22. In some embodiments, more than two sensors are provided to gather more information about the lateral profile of heavy crop matter moving along the grain bed 22 in crop material flow 300.

At a minimum, the present invention provides sensors such that variance in crop material distribution in the grain bed 22 can be detected. In other embodiments, sensors can be positioned to detect variance in distribution anywhere in grain bed 22, whether it be for example in front on a pre-sieve 27, between the pre-sieve 27 and upper sieves 26, along the sides of the grain bed 22, or at the grain bed rear 322.

A first sensor that maybe used with some embodiments of the present invention utilizes feeler rods connected to potentiometers to relay information to a computer control system. Feeler rod assemblies can be positioned near the grain bed rear 322 on either the distribution side 310 or far side 312 to monitor the volume of heavy crop matter flow. More than two feeler rods sensors can also be used to gather more accurate information about the lateral distribution of crop material traveling within the sieve dividers 309 along the grain bed 22. These additional feeler rods may be positioned from sides 310 and 312 to extend into crop matter flows 300 and heavy crop matter flow 306. Feeler rod assemblies can also be positioned on the sieve dividers 309 and in some embodiments, feeler rod assemblies may be positioned on a sieve member 391. In some conventional grain beds, a sieve member 391 may be installed anywhere on the grain bed 322 to split the row of sieves and runs parallel to sides 310 and 312.

An exemplary feeler rod sensor comprises a pivot housing to support any potentiometers that monitor an angular change in rod position. The feeler rod sensor also comprises a thin gauge bar that is bent and angled such that the rod is deflected by the flow of crop material, thereby indicating the local volume or thickness of material flow in the vicinity of the sensor. By measuring the amount of deflection of the feeler rod, the feeler rods sensor converts the relative amount (e.g. volumetric quantity) of crop material or heavy crop matter causing the deflection to an electrical signal. By utilizing at least two feeler rod sensors, one on either side, the feeler rod sensors can indicate the relative amount of crop material moving along in the grain bed 22, versus any other part of the grain bed 22. In, this particular embodiment, the feeler rod sensors can indicate the relative amounts of heavy crop matter exiting any part of the grain bed rear 322, versus any another part of the grain bed rear 322.

An exemplary feeler rod sensor 450 is shown in FIGS. 10A (front facing view) and 10B (right facing view) and 10C (top view). Sensor housing 460 houses mechanical electrical sensing circuitry (such as a potentiometer or other electro-mechanical sensor) that detects deflection of the feeler rod 451, which is caused by crop matter, or in this embodiment heavy crop matter, including grain and MOG, flowing underneath. A feeler rod 451 is coupled to the sensor housing 460, such that the topmost portion 452 couples to circuitry that can detect rotation section 452. By coupling this location of topmost portion 452 to the mechanical-electrical sensor in housing 460, the feeler rod sensor 450 can be mounted away from the grain bed 22 itself. Vertical support section 454 extends downward from sensor section 452 such that section 454 is substantially vertical. Section 454 allows sensor section 452 and housing 460 to be placed out of the way of flowing crop material. In some embodiments section 454 is curved within a longitudinal plane of the combine. By curving section 454 feeler rod 451 can have a center of gravity that is closer to sensor housing 460, limiting the downward bias and increasing sensitivity. From section 454, the feeler rod 451 bends into horizontal detection section 456. Horizontal detection section 456 extends rearward, at a slight angle to the direction of the flow of grain, as seen in the top view of FIG. 10C. Horizontal detection section 456 effectively extends the lever arm a feeler rod 451 such that the sensor housing 460 can experience a larger amount of torque. By angling horizontal detection section 456 laterally, the horizontal detection section can detect the flow across a broader portion of the flow. As matter flows past horizontal detection section 456, horizontal detection section 456 is deflected upward such that it substantially floats on top of the flow of crop material, or in this embodiment heavy crop matter. The amount of deflection experience by horizontal detection section 456 is sensed by mechanical electrical sensor housed in housing 460. This allows the feeler rod to measure a volumetric quantity of material flowing past feeler rod 451. In some embodiments housing 460 is mounted to the grain bed rear 322 on the under side of the cross member 325 or on cross bar 326 in FIG. 9. The cross bar 326 approximates cross member 325 length and comes in contact with all heavy matter exiting the grain bed rear 322. Cross bar 326 is located parallel to and stepped below the surface of cross member 325. This allows feeler rod sensor 450 to detect the level of material moving off the grain bed rear 322. The feeler rod sensor 450 may be calibrated to sense heavier material flowing over the feeler rod 451. In this embodiment, feeler sensor rod is calibrated to sense heavier load due to heavy crop matter, grain and MOG, piling at the feeler rod 451, as opposed to various other crop material being blown by the fan blower 30. By utilizing multiple feeler rod sensors 450 along the width of the grain bed rear 322, feeler rod sensors 450 can provide electrical signals that indicate the relative uniformity or non-uniformity of the lateral loads across the grain bed 22 due to heavy crop matter loss. In other embodiments, feeler rod sensors 450 may be utilized anywhere in or in proximity to the grain bed 22, including between sieves or along grain bed sides, to sense distribution of crop material anywhere in the grain bed 22.

A second suitable sensor for use with the present invention includes load cell weight detectors. Load cells operates by determining the force placed on it, e.g. the weight of the material pressing down on to the load cell. In this manner, a load cell measures a mass quantity of local material passing the load cell. In some embodiments, load cell sensors may be integrated into the cross member 325 at the grain bed rear 322. In other embodiments, load cell sensors can be integrated with cross bar 326 running behind and parallel to the cross member 325. The load sensors would measure the weight of accumulated grain piling on the cross member or cross bar in some embodiments to determine whether heavy crop matter loss exists and where it occurs on the grain bed rear 322 and thus the loading uniformity/non-uniformity of crop material across the grain bed. Sensors can be placed anywhere in or in proximity to the grain bed 22, including on sieves or dividers 309, to sense weight of crop material and thus the distribution of crop material anywhere in the grain bed 22. By measuring the relative weight between at least two load cells, the amount of lateral load uniformity or non-uniformity in the grain bed can be detected.

Exemplary load cells can include capacitive devices, resistive devices, piezoelectric devices, or that any other sensor mechanism in the prior art sufficient to produce an electrical signal in response to the amount of force applied to the sensor. In some embodiments, load cells may be integrated with a freely moving, substantially planar surface or multiple surfaces to allow more accurate detection of mass/weight by multiple loads sensors.

A third sensor suitable for use with the present invention is similar to the load cells described above, but rather than monitoring the entire steady-state force applied to sensor these sensors act as quantize loads sensors. The quantized loads sensors act to monitor changes in the dynamic load such that the sensors can count the amount of heavy crop matter particles, grain and/or MOG particles, hitting the sensor during a period of time. In this way the quantize loads sensors act to count quanta of force, such as the number of grains that hit the sensor during the measurement interval. These quantized load sensors can thereby measure a local quantity of flow in the heavy crop matter hitting the sensor. In some embodiments, these quantized loads sensors are preferably located on the cross bar 326 to measure the amount of heavy crop matter particles falling off the grain bed rear 322. In other embodiments, the quantized loads sensors may be integrated in the cross member 325 to measure the amount of grains impacting the surface as they move over the member and off the grain bed rear 322. A person having skill in the art may also choose to place quantized load sensors anywhere else in or in proximity to the grain bed that may be appropriate for this purpose. Exemplary quantized load sensors can include capacitive devices, resistive devices, piezoelectric devices, such as microphones, or any other sensor mechanism in the prior art sufficient to produce an electrical signal in response to the quantity of particles impacting the sensor.

Referring again to FIG. 9, sensor locations are identified that may be used with embodiments of the present invention. In this example, three sensors are used for determining heavy crop matter loss at the grain bed rear 322 and thus the non-uniformity of lateral load distribution across the grain bed. A first series of suggested locations for sensors in the example shown in FIG. 9 is 350*a-c*. Locations 350*a-c* are suitable for a load sensors and quantized loads sensors. By placing a load sensor or quantized loads sensor in or on the cross member 325, the present invention can detect an approximate distribution of the mass of heavy crop matter leaving the grain bed 322. In some embodiments it will be appreciated that only two sensors are needed to determine non-uniformity in the lateral load distribution based on loss of heavy crop matter exiting.

In some embodiments, feeler rod sensors, such as 450, may be additionally, or alternatively, placed in the vicinity of locations 350*a-c*. This allows the feeler rod sensors to detect the local volumetric quantity of heavy material exiting the grain bed. It will be appreciated that any number of sensors larger than one maybe used to detect the load uniformity of heavy material exiting the grain bed.

In some embodiments, quantized load sensors or weight detectors are additionally, or alternatively, placed at locations 350*d-f* on cross bar 326. By placing sensors at locations 350*d-f*, the load sensors can directly measure the heavy crop matter exiting the rear of the grain bed over the cross member 325 and onto the cross bar 326. It will be appreciated that in this example any number of sensors may be desirable to measure the uniformity of heavy crop matter exiting the grain bed. Some embodiments may include sensors in more than one of the above locations. Some embodiments may include sensors at various above locations, including any subset of the above locations. Some embodiments may include multiple types of sensors located at multiple locations.

It will be appreciated that the locations of the sensors for measuring the heavy crop matter loss, and thus the uniformity of lateral load distribution of crop material, in many embodiments, are substantially approximate to the grain bed rear 322 of the cleaning system, or within these systems substantially near that boundary. Sensors can be placed in any location that is deemed suitable for approximating the lateral load non-uniformity in the grain bed.

Alternative sensors in the art may also be incorporated in the invention. Optical sensors, such as a photo diode or camera, may be located in or in proximity to the grain bed to sense distribution of crop material, by sensing the level of grain piling all along the grain bed. In some embodiments, the optical sensors can sense crop material piling laterally across the grain bed between sieves or along the length the grain bed between thresh crop flow 302 entering the grain bed and heavy crop matter flow 306 exiting the grain bed. Electromechanical level switches may also be incorporated to measure crop material distribution, switching when piled crop material reaches a certain threshold height anywhere in the grain bed as crop material accumulates. These alternative sensors and all sensors discussed above, incorporated in various embodiments of the invention, can be placed in any location that is deemed suitable for approximating the distribution of crop material in the grain bed. Locations include positions anywhere along the grain bed, where crop material flows 300 across the grain bed, where thresh crop flow 302 or tailings flow 304 enters the grain bed, and/or where heavy crop matter flow 306 exits the grain bed 22.

Figure 11:
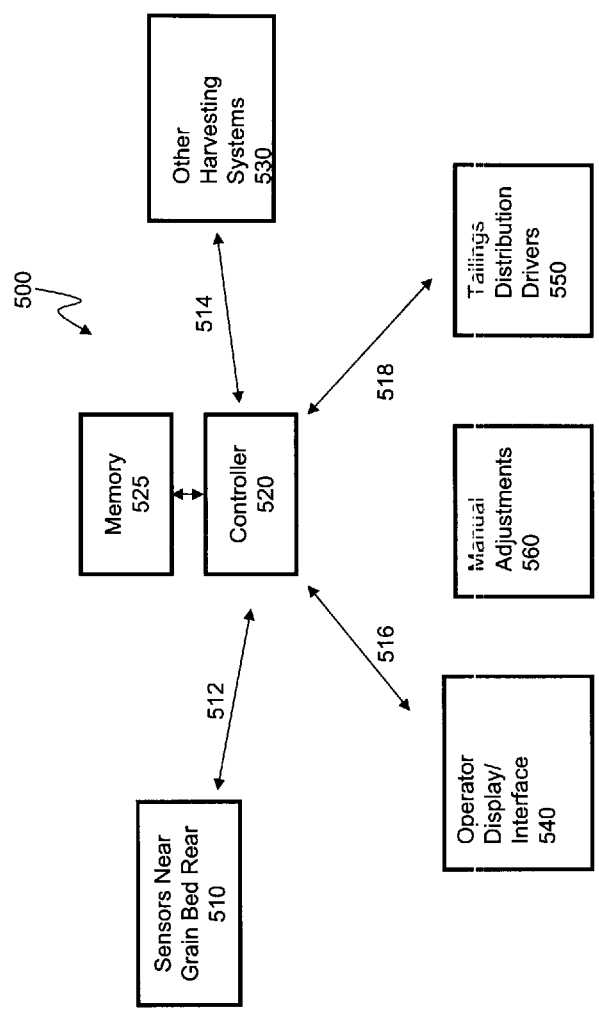
FIG. 11 is a system diagram of an embodiment of the present invention for monitoring and adjusting load uniformity of crop material on the grain bed of the cleaning system.

FIG. 11 is a top-level diagram of one embodiment of a control system 500 for adjusting parameters of the combine to ensure that the distribution of crop material in the grain bed is substantially or approximately uniform with tailings being redistributed to the grain bed. Sensors 510 are of types described above, that are sufficient to determine an approximation of total crop distribution in the grain bed, and in this embodiment where heavy crop matter loss is occurring, the lateral load uniformity of crop matter in the grain bed. In this embodiment, sensors 510 convey information about heavy crop matter exiting the grain bed and thus the lateral load uniformity/nonuniformity of crop material across the grain bed 22, to a controller 520 via electrical signal path 512. Electrical signal path 512 can be an analog, digital or CAN bus. Controller 520 accesses programming and data information from memory 525. This data can include information about the current configuration of the combine, user profile files, and more configuration files. The instructions obtained from memory 525 may include information sufficient to make a determination regarding changes to the configuration of the combine based on sensor input received from sensors 510.

Controller 520 can receive information about the current status of the combine configuration and parameters from any number of systems onboard the combine 530 via signal path 514. These systems may be any systems available on the combine known in the prior art. For example, information received by the controller 520 via signal path 514 may include information about the current status. These systems 530 may also report information such as the type of threshing mechanism being used, the type of crop, the angle at which the harvester is operating in relation to a slope or hill, the current speed of the combine, whether combine is currently harvesting or not, or any other information that may be useful in addressing lateral load uniformity of crop material in the grain bed, as would be apparent to one having ordinary skill in the art.

Controller 520 may interact with the operator of the combine via operator display interface 540, which is accessible to controller 520 by signaling bus 516. Signal path 516 allows the controller to receive operator input or to send messages to the operator of combine. An exemplary interaction between the controller 520 and the operator display interface 540 can include alerting the operator that an electrical or manual adjustment needs to be made to address a load non-uniformity in the grain bed. Controller 520 can also seek operator permission to perform a recommended adjustment determined by controller 520. Controller 520 can further alert the operator of any manual adjustments that might be recommended. For example, graphical operator interface 540 can include a screen such as a CRT, LCD, LED, OLED, AMOLED, or other appropriate screen. Graphical operator interface 540 can further include input devices such as buttons, keypads, touch screens, or the like.

In some embodiments, controller 520 may automatically make adjustments to the configuration of the combine by controlling tailings distribution drivers 550 via signal path 518. Exemplary drivers that may be controlled in some embodiments include drivers to control the angle of deflection on the deflector 296 on the tailings distribution system 40, motors to increase or decrease the speed of one, some, or all impellers in the tailings distribution unit, or any other adjustments disclosed herein. This will allow controller 520 automatically to adjust the flow of tailings conveyed from the tailings distribution system 40 to various locations on the grain bed 22 closer or further from the tailing distribution unit, and/or in some embodiments, between various sieve dividers 309. It will also be appreciated the drivers 550 can also control any other mechanical system that may be sufficient for altering distribution of tailings to the grain bed. Drivers 550 can include any electrically adjustable mechanical device including motors, electro mechanical devices, hydraulically or pneumatically actuated systems, or the like.

If controller 520 determines that adjustments need to be made to the configuration of the combine that are not available to be adjusted via drivers 550, controller 520 can alert the operator via interface 540 to manually adjust systems via manual adjustments 560. The option to request manual adjustment via interface 540 may allow some embodiments of the present invention to be used with older combines that lack drivers or when the amount of adjustment available via the driver is insufficient to make the tailings reenter the grain bed to result in substantially even distribution of crop material in the grain bed 22.

In some embodiments, digital signal or analog signals or signals that comply with any desired standard can be used for signaling paths 512, 514, 516, and 518. In some embodiments, CAN signals are used to take advantage of existing CAN busses in the harvester 10. This also allows the system 500 to be integrated with other systems onboard the harvester 10 and allows simple standards-based electronic control. It should be noted that not all signaling paths 512, 514, 516, and 518 need to be bidirectional in all embodiments.

Controller 520 can be a one or more microcomputer, microcontroller, or processor including appropriate peripherals such as memory, power source, data buses, and other circuitry appropriate for carrying out its controller functionality. Controller 520 can use memory 525 to store data (e.g. saved settings, recorded status information, configuration files, user profiles, etc) or instructions (e.g. applications, algorithms, or programs used in the operation of the present invention) for use during operation of the system 500. Memory 525 is accessible to controller 520 and can be a local RAM, ROM, flash memory, hard drive, solid state storage, removable memory, or any combination or subset thereof.

Controller 520 can be a single unit that is used for multiple systems within harvester 10, besides the system 500 of the present invention. For example, controller 520 may be part of a larger electronic control circuit that may be responsible for ignition systems, driving systems, harvesting systems, entertainment systems, climate-control systems, or a number of other systems that maybe used in harvester 10.

Figure 12A:
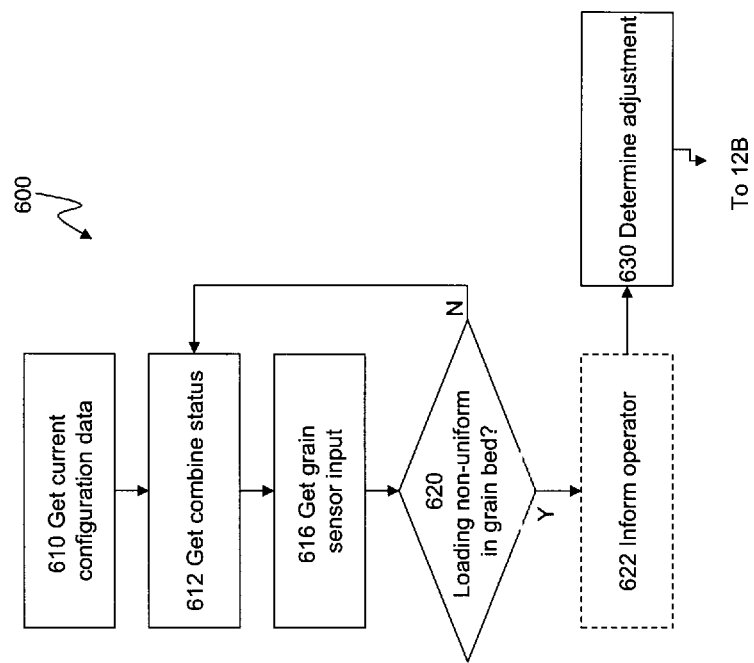
FIGS. 12A and 12B comprise an exemplary flow diagram for an embodiment of the present invention.
Figure 12B:
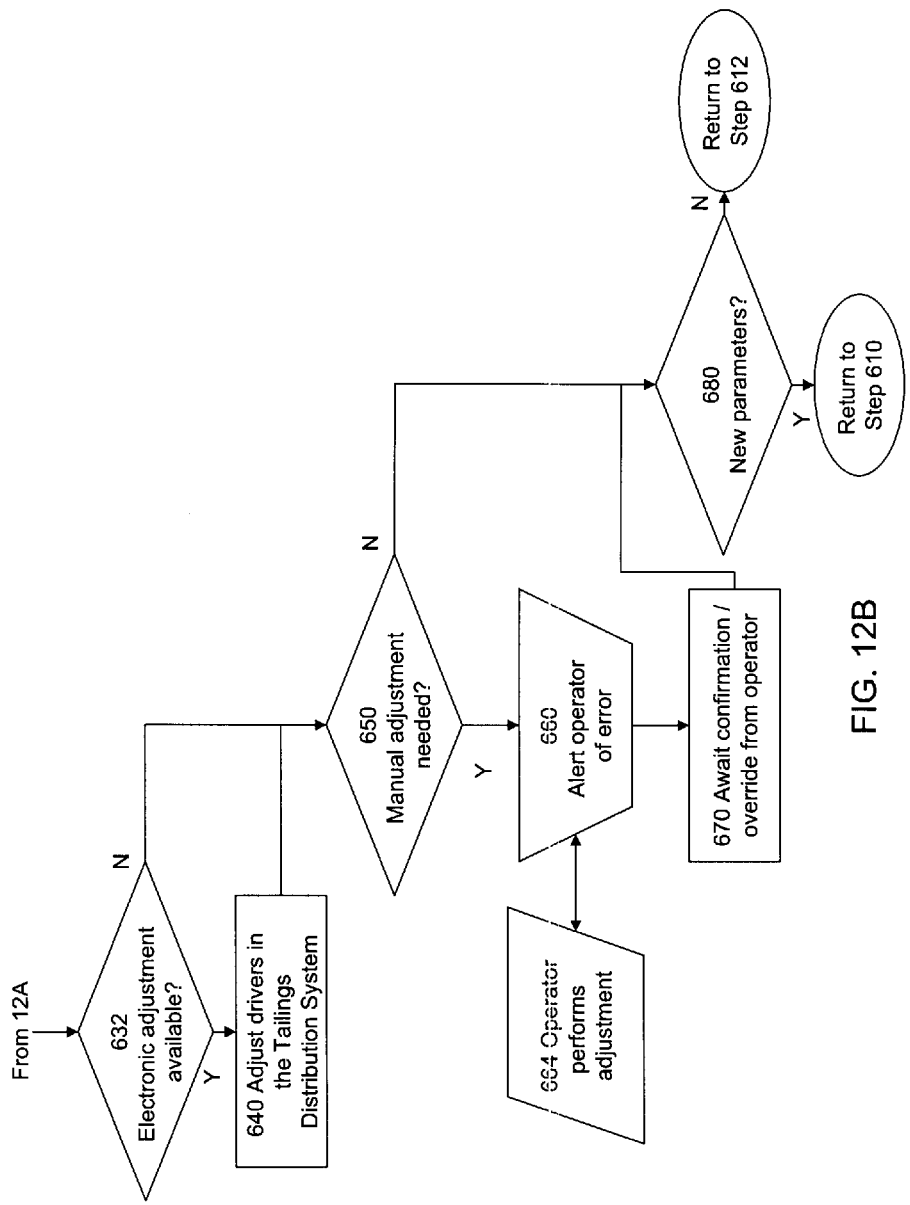

FIGS. 12A and 12B show an exemplary method 600 for use with some embodiments of the present invention. Method 600 utilizes sensor data to determine whether even distribution of crop material in the grain bed 22 exists. In this embodiment, sensor data determines the load uniformity across grain bed 22 based on heavy crop matter loss at grain bed rear 322 and can automatically make adjustments to electric drivers to reduce the unevenness in substantially real-time or can alert the operator of the problem and inform the operator what manual adjustments can be made to mitigate the non-uniformity integrated.

At step 610, system 500 gets configuration data such as by gathering configuration data is stored in memory 525. At step 610, the system may also gather configuration data by seeking user input via interface 540. For example, the operator may inform the controller 520 of the type of harvest being conducted, such as the type of crop conditions, elevation types in the field, and any parameters the user may want to input. These inputs can also be stored in some embodiments into memory 525.

At step 612, controller 520 gathers information about the combine status such as through electrical signals to communicate with combine systems 530. This enables the controller 520 to gather necessary information about the current operation of the combine. For example, the combine controller 520 may gather information about the present rotor speed of impellers, such as 246, 248, and/or 272, in the tailings distribution system 40, as shown in FIG. 7 or the present angle of deflection of deflectors 296 in the tailings distribution system 40.

At step 616, the controller 520 gathers input from the monitoring sensors 510. These sensors operate in accordance with any of the embodiments described throughout this specification. At step 620, the controller determines based on the sensor information received if there is any substantial lateral load non-uniformity of crop material in the grain bed. This determination can include a threshold so that adjustments may be avoided if insubstantial non-uniformity is detected in the bed. In some embodiments, the controller 520 compares the relative values from sensors, such as by way of subtracting operation, to determine if a differential between high and low parts of the crop material flow exceeds a threshold. In other embodiments, the controller 520 can use a differential amplifier, such as a comparator or op amp, to determine differences between analog signals. In other embodiments the determination can include observing a time varying differential between sensors such that the controller can extrapolate expected differential and address the non-uniformity before it becomes a problem. In other embodiments controller 520 can use a proportional integral derivative (PID) algorithm or any other similar control feedback loop mechanism to supply signals to drivers such that non-uniformities are prevented before they exceed a threshold.

If at step 620 the controller 520 determines that the grain bed is uneven, based on for instance in this embodiment heavy crop matter loss occurring at the rear of the grain bed, the system 600 proceeds to step 622. Step 622 is an optional step in some embodiments. At step 622, the controller 520 informs the operator via a user interface 540 that there is a non-uniformity that should be corrected. In some embodiments, the system will inform the operator of the type and degree of a non-uniformity and in other embodiments the system will additionally or alternatively inform the operator of amount of heavy crop matter loss from the grain bed. In some embodiments, this information will give the operator a chance to override system 500 such that if a non-uniformity is minor and the operator determines that an adjustment is not critical, the method in the system 600 can be restarted, paused, or aborted.

If the system proceeds to step 630, controller 520 will determine the best course of action to adjust parameters of the combine to mitigate the non-uniformity detected. In some embodiments the result of this information is also displayed to the operator. Controller 520 can use instructions retrieved from memory 525 to make this determination. This determination may be based on any algorithm that is known in the art. Furthermore, this determination can take into account which systems are most easily adjustable via drivers. In some embodiments this determination can take into account operator preferences that may be stored in memory 525. In yet another embodiment, if multiple courses of action could be used to mitigate the non-uniformity, the system may display choices for adjustment to mitigate the non-uniformity to the operator via interface 540.

Referring to FIG. 12B, at step 632 the system determines if any of the available adjustments can be carried out via electronic adjustment, such as through the use of drivers 550. In some embodiments electronic adjustments are favored because they require less operator involvement and can be substantially automated without distracting the operator, and may further allow mitigation of lateral load non-uniformity of crop material in the grain bed in substantially real-time. Electronic adjustments to drivers 550 can also be used in embodiments where the system does not report the need for adjustment if electronic adjustment can be made without operator interaction.

At step 640, electronic adjustment is available to mitigate the non-uniformity, controller 520 will interact with drivers 550 or other electronically controlled elements to perform the electronic adjustment. In some embodiments, electronic drivers, mechanical drivers, or other elements may adjust any number of impeller rotation speed; orientation of directional deflectors; or any other adjustments to the tailings distribution system to alter direction of tailings conveyed to the grain bed 22. This step can involve a two-way exchange of information in signal path 518, such as by verifying that the adjustment has been implemented by drivers. Verification can be made via analog load sensing where analog or digital information is sent back by the driver. In some embodiments, information about the status of the adjustment is unavailable to controller 520 but controller 520 can review the effects of the adjustment via sensors 510 in the next loop of the feedback cycle.

At step 650, the system further determines if manual adjustment to combine configuration is available and needed. For example, if the combine is unequipped with positional deflectors on the tailings distribution system, the system controller 520 can inform the operator the need to perform manual adjustment via interface 540. In some embodiments, manual adjustment may be made to any number of: impellers; directional deflectors; or any other components of the tailings distribution system 40 to alter direction of conveyed tailings onto the grain bed 22.

If manual adjustment is needed at step 650, the system alerts the operator at step 660. At step 664 the operator may manually perform the adjustment. Alternatively, at step 660 the operator may decline performing the adjustment. For example, if the adjusted adjustment requested requires a shut down of the combine, the operator may choose to address the adjustment at later time.

At step 670, the system awaits confirmation or input from the operator. In some embodiments, the system can determine that the adjustment has been made automatically, such as through interaction with systems 530. Step 670 may allow the system to continue to monitor and make electronic adjustments as well.

At step 680, the system checks to see if the operator has entered a new parameters. For example if the operator determines that the system is requesting manual adjustments to the combine configuration too frequently, the operator may enter a new threshold or change user preferences to adjust how the system reacts to uneven amounts of crop material in the grain bed.

If no new parameters are entered by the user, the system may return to step 612 and again begin monitoring combine status and sensor inputs. If, however, new parameters are entered, the system can return to step 610 and restart the method 600, including getting new configuration data.

Although the invention has been described with reference to exemplary embodiments, it is not limited thereto. The invention may apply to any cleaning, rethreshing, or tailings distribution system. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed:

1. A combine comprising:
a cleaning system having a grain bed having a front end, a rear end, and two sides, wherein the two sides are parallel to each other from across a width of the grain bed and wherein the length of the grain bed extends from the front end to the rear end of the grain bed;
a cleaning conveying system for processing a crop material by moving the crop material between the front end and the rear end of the grain bed;
a tailings distribution system that receives crop material previously processed in the cleaning system and redistributes the previously processed crop material back to the cleaning system;
one or more sensors placed at the grain bed for monitoring crop material distribution in the grain bed;
a control system for receiving a signal from the one or more sensors; and
a tailings distribution adjustment mechanism for adjusting the crop material redistribution in response to the sensed crop material distribution in the cleaning system, wherein the tailings distribution adjustment mechanism comprises an adjustable deflector, the adjustable deflector is alterable about a pivot connection the tailing system, the pivot connection is pivotal about an axis substantially perpendicular to the grain bed, further wherein when the one or more sensors detects an uneven crop material distribution in the grain bed, the control system adjusts the tailings distribution adjustment mechanism about the pivot connection to alter the angle of the adjustable deflector to redistribute the crop material evenly on the grain bed.

2. The combine of claim 1, wherein the tailings distribution adjustment mechanism comprises an impeller having an adjustable speed.

3. The combine of claim 1, wherein the altered angle is any angle to redistribute crop material to any location across the width of the grain bed.

4. The combine of claim 1, wherein the altered angle is any angle to redistribute crop material to any location across the length of the grain bed between the front end and the rear end.

5. The combine of claim 1, wherein the tailing distribution adjustment mechanism further comprises an impeller having adjustable speed.

6. The combine of claim 1, further comprising an operator interface for displaying information about crop material distribution in the grain bed.

7. The combine of claim 6, wherein the control system displays, via the operator interface, recommended adjustments to correct crop material distribution in the grain bed based on the information.

8. The combine of claim 1, wherein the one or more sensors comprise one or more feeler rod sensors for detecting a local volume of crop material.

9. The combine of claim 8, wherein the one or more feeler rod sensors are mounted in proximity to the rear end of the grain bed.

10. The combine of claim 1, wherein the one or more sensors comprise one or more optical sensors for detecting a local volume of crop material.

11. The combine of claim 10, wherein the one or more optical sensors are located in proximity to the sides of the grain bed.

12. The combine of claim 1, wherein the one or more sensors comprise one or more load sensors for detecting a local mass of crop material.

13. The combine of claim 12, wherein the one or more load sensors are located in proximity to the rear end of the grain bed.

14. The combine of claim 1, wherein the one or more sensors comprise one or more level switches for detecting an accumulation of crop material in relation to a level threshold.

15. The combine of claim 14, wherein the one or more level switches are located in proximity to the sides of the grain bed.

16. The combine of claim 1, wherein the one or more sensors comprise one or more quantized load sensors for detecting a number of crop material particles flowing in a local area.

17. The combine of claim 16, wherein the quantized load sensors lie in proximity to the rear end of the grain bed.

18. The combine of claim 1, wherein the control system drives an electric actuator to alter the adjustable deflector about the pivot connection.

* * * * *